(12) United States Patent
Davies et al.

(10) Patent No.: US 9,408,062 B2
(45) Date of Patent: Aug. 2, 2016

(54) METHOD OF MANAGING RESOURCES IN A SECONDARY STATION

(71) Applicant: KONINKLIJKE PHILIPS N.V., Eindhoven (NL)

(72) Inventors: Robert James Davies, Eindhoven (NL); Timothy James Moulsley, Caterham (GB); Choo Chiap Chiau, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/538,344

(22) Filed: Nov. 11, 2014

(65) Prior Publication Data

US 2015/0065118 A1 Mar. 5, 2015

Related U.S. Application Data

(63) Continuation of application No. 13/695,660, filed as application No. PCT/IB2011/051881 on Apr. 28, 2011, now Pat. No. 8,886,173.

(30) Foreign Application Priority Data

May 3, 2010 (EP) .................................... 10305470
Jun. 21, 2010 (EP) .................................... 10305661

(51) Int. Cl.
*H04L 29/06* (2006.01)
*H04M 1/725* (2006.01)
(Continued)

(52) U.S. Cl.
CPC .............. *H04W 8/18* (2013.01); *H04W 72/048* (2013.01); *H04W 52/0261* (2013.01); *H04W 52/0277* (2013.01); *H04W 72/0413* (2013.01); *H04W 84/045* (2013.01)

(58) Field of Classification Search
CPC .................................................... H04W 72/048
USPC .......... 455/412.1, 412.2, 414.1, 414.2, 414.3, 455/432.1, 432.3, 433, 435.1, 435.2, 435.3, 455/456.1, 456.2, 456.3, 456.4, 456.5, 455/456.6
See application file for complete search history.

(56) References Cited

U.S. PATENT DOCUMENTS 6,263,211 B1 7/2001 Brunner et al.
6,603,969 B1 8/2003 Vuoristo et al.
(Continued)

FOREIGN PATENT DOCUMENTS

CN 101542920 A 9/2009
JP 2006502654 A 1/2006
(Continued)

OTHER PUBLICATIONS

Philips "Operating Profiles for UE", 3GPP TSG RAN WG2 #70, R2-103168, May 7, 2010, p. 1-3.
(Continued)

*Primary Examiner* — Christopher M Brandt (57) ABSTRACT

A method for communicating in a mobile communications network including a primary station communicating with at least one secondary station comprising communication means for communicating with a primary station,
the method comprising the step (a) of the secondary station signaling at least one preferred operating profile out of a plurality of available operating profiles in response to an event.

32 Claims, 2 Drawing Sheets

(51) Int. Cl.
*H04W 24/00* (2009.01)
*H04W 8/18* (2009.01)
 H04W 52/02 (2009.01)
 H04W 72/04 (2009.01)
 H04W 84/04 (2009.01)

(56) References Cited

U.S. PATENT DOCUMENTS

| | | |
|---|---|---|
| 6,701,144 B2 | 3/2004 | Kirbas et al. |
| 6,721,542 B1 | 4/2004 | Anttila et al. |
| 7,061,898 B2 | 6/2006 | Hashem et al. |
| 7,221,939 B2 | 5/2007 | Ylitalo et al. |
| 8,365,162 B2 | 1/2013 | Rauma |
| 8,494,509 B2 | 7/2013 | Serafat et al. |
| 8,588,730 B2 | 11/2013 | Zohar |
| 2002/0160811 A1 | 10/2002 | Jannette et al. |
| 2003/0207683 A1 | 11/2003 | Lempio et al. |
| 2004/0073711 A1 | 4/2004 | Pelletier et al. |
| 2004/0204181 A1 | 10/2004 | Cromer et al. |
| 2005/0170845 A1 | 8/2005 | Moran |
| 2006/0030316 A1 | 2/2006 | Lando |
| 2006/0197660 A1 | 9/2006 | Luebke et al. |
| 2007/0091836 A1 | 4/2007 | Oprescu-Surcobe et al. |
| 2007/0259655 A1 | 11/2007 | Minborg et al. |
| 2008/0220759 A1 | 9/2008 | Norrman |
| 2009/0239534 A1 | 9/2009 | Jang et al. |
| 2011/0086611 A1 | 4/2011 | Klein et al. |

FOREIGN PATENT DOCUMENTS

| | | |
|---|---|---|
| JP | 2007235558 A | 9/2007 |
| WO | 2007050687 A2 | 5/2007 |

OTHER PUBLICATIONS

Vodafone Group, "New UE Capability for RRM Optimisation", 3GPP TSG RAN WG2 #48, R2-051764, August 29, 2005, p. 103.

METHOD OF MANAGING RESOURCES IN A SECONDARY STATION

CROSS REFERENCE TO RELATED APPLICATIONS

This application claims the benefit or priority of and describes the relationships between the following applications: wherein this application is a continuation of U.S. patent application Ser. No. 13/695,660, filed Nov. 1, 2012, which is the National Stage of International Application No. PCT/IB2011/051881, filed Apr. 28, 2011, which claims the priority of foreign application EP10305470 filed May 3, 2010 and EP10305661.0 filed Jun. 21, 2010, all of which are incorporated herein in whole by reference.

FIELD OF THE INVENTION

The present invention relates to a method for communicating in a mobile communication network including a primary station communicating with at least one secondary station. The present invention relates particularly, but not exclusively, to mobile telecommunication networks.

BACKGROUND OF THE INVENTION

Figure 1:
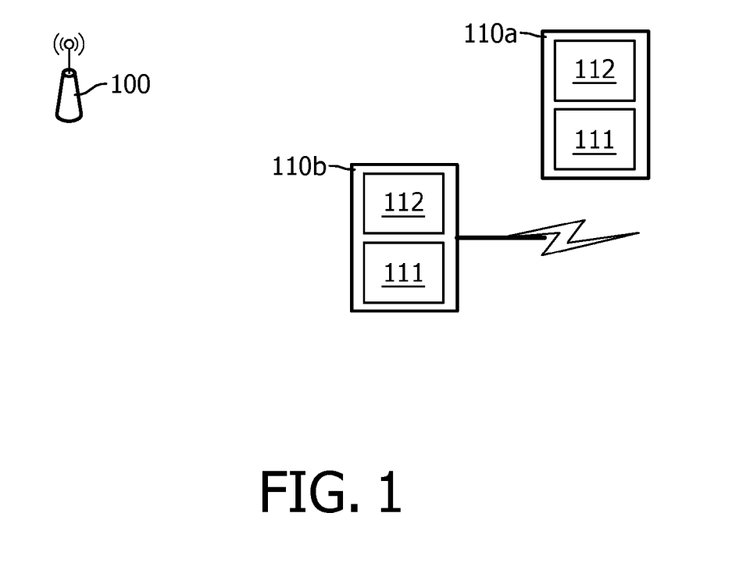
FIG. 1, already described is a block diagram of a system in which the invention is implemented.

In mobile communication networks like GSM, UMTS or UMTS Long Term Evolution (LTE) networks, as illustrated on FIG. 1, a primary station 100 communicates with a plurality of secondary stations 110. These secondary stations 110 are typically handheld devices including batteries 111 supplying a communication device 112. To extend the operation time of the secondary stations without increasing the size of the batteries, it is currently desirable to reduce the power consumption of the secondary stations (or User Equipments (UEs)). In addition, if the battery charge becomes depleted, rather than exhaust the remaining energy, it would often be desirable to further reduce power and conserve energy, for example by adopting a more limited form of operation with reduced performance or fewer supported services.

It could be possible for example to transmit to the primary station a power limitation indicator, whose purpose is to allow the secondary station to indicate to the primary station and fixed network a condition of limited power availability. These indicators may be used to differentiate between devices that are mains-powered like secondary station 110b and those that are battery-powered or to indicate a low battery status.

When a secondary station registers for the first time (and on infrequent occasions thereafter), it indicates to the fixed network its capabilities via the UE Capabilities information elements or a UE category. This information could include, for example the number of UE Rx antennas and the maximum data rate that the UE can receive. The fixed network therefore has knowledge of what the UE is physically capable of doing and can instruct the UE to behave in accordance with network requirements and capacity, data delivery requirements and the UE's own operational limits.

It is to be noticed that it is difficult to define the threshold for signaling a change in status in a way that allows the primary station or fixed network to consistently respond in a meaningful way. For example, should the change in status be signaled at some predetermined battery capacity (e.g., 50% battery capacity? 20%? 10%?). A further associated consideration is that given that battery capacities vary according to the secondary station, such as, for example, battery size, technology and battery ageing and given that secondary station power consumption depends somewhat on implementation details, it would not be clear, for example, what "50% battery capacity" would actually mean for the secondary station. It is also not clear what it would mean for a user. For example, does the user expect to be able to place the secondary station on charge or does the user prefer to economize on energy consumption as much as possible?

In addition to limited battery power, the available signal processing power or signal reception capability of the secondary station may also depend on a host of other factors, which may include, the reception of MBMS (Multicast/Broadcast Multimedia Services, other transmissions, or processing the output of a video camera) are currently in use or not.

SUMMARY OF THE INVENTION

A method is proposed for operating a secondary station which offers more flexibility with respect to the management of the secondary station resources.

In one embodiment, the method offers enhanced flexibility with respect to the management of the remaining charge in a secondary station battery.

A mobile communication system is proposed in which the secondary station operates in accordance with a method for operating a secondary station which offers more flexibility with respect to the management of the secondary station resources.

According to one aspect, the method enables the secondary station to indicate explicitly, flexibly and clearly to the fixed network what its current operating priorities and capabilities are. For example, how it would like to conserve power, or whether all the terminal processing power is currently available.

According to another aspect, the present invention enables the user's preference to be taken into consideration.

According to another aspect, the method of the present invention is adaptable in scope to uniquely match each secondary stations' implementations having different capabilities.

In accordance with, one non-limiting method embodiment for operating a secondary station, comprising communication means for communicating with a primary station, the method comprises the steps of:
  the secondary station signaling a first subset of operating profiles out of a plurality of available operating profiles; and
  the secondary station signaling at least one preferred operating profile out of the first subset of operating profiles in response to an event.

According to one aspect, when the secondary station needs to operate in accordance with a new operating profile in response to an event, instead of signaling the event to the primary station, the secondary station can pre-choose an appropriate operating profile. In this manner, the primary station can respond to the pre-chosen operating profile by approving or rejecting or proposing another operating profile. This allows a higher flexibility and signaling efficiency. The secondary station can thus propose in a timely manner an appropriate operating profile with respect to the conditions encountered and the capabilities available.

According to another aspect, a secondary station is provided comprising: communication means for communicating with a primary station, the communication means being arranged for transmitting an indication of at least one preferred operating profile out of a plurality of available operating profiles in response to an event.

According to another aspect, a primary station is provided comprising:

communication means for communicating with a secondary station, the communication means being arranged for receiving from the secondary station at least one preferred operating profile out of a plurality of available operating profiles in response to an event, and control means for deciding whether the communication means need to be changed in accordance with the preferred operating profile.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a network as illustrated on FIG. 1. The network includes a primary station 100 communicating with a plurality of secondary stations 110. The secondary stations 110 are typically handheld devices including batteries 111 supplying a communication device 112. The communications between the primary station 100 and the secondary stations takes place on downlink and uplink channels. Along with the evolution of the technology, and in particular, for mobile telecommunication with Long Term Evolution of UMTS, several different transmission modes are possible. For example, in UMTS LTE, MIMO (Multiple Input Multiple Output) communications are enabled based on an array of antennas situated at both the primary station and the secondary stations. The several different transmission modes may require a large amount of station resources and energy which may not be always available. For example, in FIG. 1, secondary station 110a may experience a low battery charge and is therefore likely to deplete the remainder of the battery power if the selected communication mode is energy greedy.

On the contrary, another secondary station 110b is shown to be currently connected to an energy source (i.e., the electricity mains) and is therefore not concerned with conserving energy.

In accordance with an embodiment of the invention, to overcome the imminent depletion of battery power experienced by a secondary station, the secondary station may supplement its current single set of capabilities by indicating to the fixed network, (e.g., the primary station 100) one or more alternative sets of operating profiles, sometimes referred to herein as an alternative capability set/profile. The alternative set of operating profiles is a subset of the full set of the existing UE capabilities or possible operating profiles. Moreover, in an optional variant of this embodiment, the secondary station can include additional information like preferred parameter values, or maximal reachable parameters values. The secondary station may indicate to the fixed network, at any point in time, that it would like to switch from a currently used capability set/profile to an alternative capability set/profile as its operational requirements change. The expected behavior of the fixed network is that, where possible, it will respect the restrictions proposed by the secondary station (from the start of the next frame/other timing epoch).

In one aspect, it is possible for the secondary station to signal only an index or an indication of a profile rather than the whole profile to the fixed network. This signaling method is more efficient in terms of signaling overhead than sending the full profile details, particularly if the operating profile is changed frequently. However, this requires either that:

the profiles are predetermined and stored in profiles libraries in the primary station and the secondary stations, or the profiles are established in a initialization phase.

The above requirements offer more flexibility in the implementation of the profiles, since the profiles can be readily adapted with the ageing of the secondary stations or when a new Operating System is installed on the secondary stations. One drawback, however, is that this may require a significantly long initialization phase utilizing a significant amount of resources and may require repetition at each reconnection.

Figure 2:
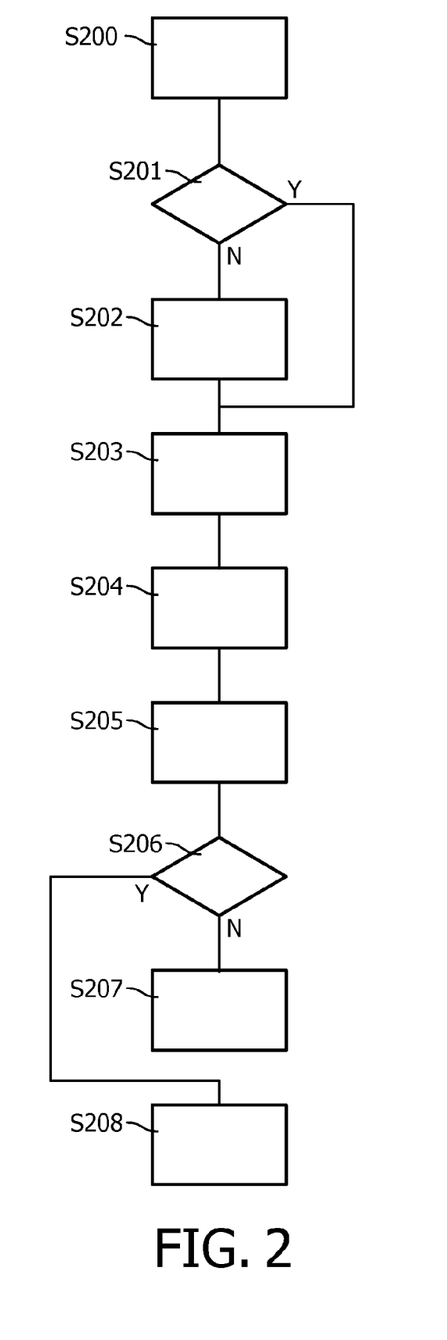
FIG. 2 is a flow chart representing a method in accordance with an embodiment of the present invention.

Referring now to FIG. 2, a method for operating a secondary station is described, according to one embodiment.

Starting at step S200, the secondary station 110 enters the network. For example, entering the network may be achieved in a number of ways including, without limitation, the mobile phone being switched on or the mobile phone entering in a cell served by a primary station 100 that offers the possibility of using and selecting different profiles. During this step S200, the secondary station 110 is registered by the fixed network, for example, the primary station 100. After registration, the primary station 100 checks whether operating profiles have been pre-stored that correspond to the secondary station of interest. A registration check may be performed by determining whether the mobile phone is registered on a central database or on a storage in the primary station 5201. In the event, that the mobile phone is determined to be registered with the network; the method goes directly to the operation phase. Otherwise, the secondary station 110 stays in the initialization phase and transmits to the primary station 100 a list of operating profiles at step S202.

In a variant of this embodiment, the secondary station 110 provides the primary station 100 with details regarding the model or the brand of the communicating device. Then, the primary station 100 can search a database to locate a list of operating profiles from the secondary station manufacturer that correspond to the secondary station 110.

Once the primary station 100 has a list of operating profiles corresponding to the secondary station, the secondary station 110 enters into the operational phase at step S203. By default, the secondary station 110 uses a default profile. Instead of using the manufacturer listed operating profile; it is also possible for the secondary station 110 to request a different operating profile during the initialization phase so that the secondary station 110 operates directly with the requested operating profile.

Next, at step S204, the secondary station 110 encounters a particular event causing the secondary station to signal an intent to change its operating profile from a current operating profile to a new operating profile. In accordance with this embodiment, a new operating profile is selected by the secondary station 110 as a preferred operating profile on the basis of an event occurring at the secondary station side. Then, the secondary station is able to signal to either the primary station or the fixed network the preferred profile that the secondary station intends to use in the future. It is contemplated that any number of events may trigger the secondary station to signal intent to use a new profile. For example, the trigger event may include one change in one or more of the following:

- Mains/battery power source: the secondary station has just been (dis)connected (from) to the mains;
- Available battery power level: the battery power charge just reached a predetermined threshold or critically low level. This level may be configured by the user to adjust according to his preferences;
- User requirements;
- Tariffs;
- Location;
- Handover;
- Activation of MBMS;
- Change in data rate;
- Service requirements (e.g., performance optimization for MBMS);
- Handover requirements;
- Operation within femto-cell or relay coverage area;
- Network service or traffic management requirements; and
- Network power management requirements.

Such triggers may result in the secondary station 110 generating a request to change its operating profile (e.g. to a specific profile) at step S205. In a variant, this so-called trigger event could lead to the network requesting the secondary station to indicate a preferred profile.

Figure 3:
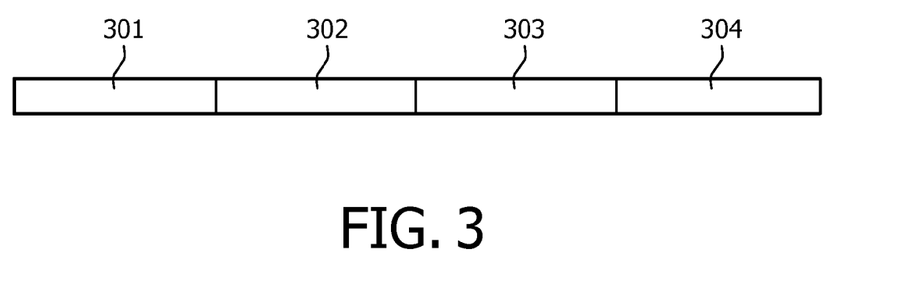
FIG. 3 is a diagram representing schematically a request for changing an operating profile in accordance with an embodiment of the invention.

An example of such a network initiated request for a new operating profile designation by the secondary station in response to a trigger event is represented in FIG. 3. This new operating profile may be signaled on a control channel or by higher signaling. Accordingly, if it uses non-UE specific resources, it will require a preamble 301 identifying the secondary station. Then, the request may comprise an index 302 being representative of the preferred operating profile. It is also possible to have a further field 303 in this request regarding some parameters values of the operating profile. Indeed, to obtain a finer adjustment of the profile, it is possible to indicate a limitation on the number of communication streams in a MIMO transmission, or a maximal data rate achievable. Moreover, in the specific exemplary request of FIG. 3, it is possible to have an indication of the previous operating profile currently used 304.

In the example of FIG. 3, only one preferred operating profile was signaled. However, in other embodiments of the invention, it is possible to signal a list of preferred profiles, which may include, for example, an order of preference.

In another variant, it is possible to also indicate the preferred profiles for use by the secondary station in their entirety along with the corresponding profile indices, in a learning phase. This allows the huge volume of resource requirements to be spread out over the first changes of operating profiles. Then, once the secondary station has used and signaled the profiles, it just uses the indices thereafter to change the profile.

In another variant, the secondary station requests preferred operating profiles by using the indices. The primary station will require the full description of any profile for which the corresponding indice is unknown or cannot be retrieved from a central database or embedded storage at the primary side.

Once the primary station 100 has received the operating profile sent by the secondary station at step S205, the primary station 100 decides on whether this request should be accepted at step S206. If it is not accepted, the primary station 100 may signal an operating profile that must be used by the secondary station 110. For example, the primary station may signal to the secondary station to use its current profile In this case, the secondary station operating profile does not change. The primary station may also signal a new operating profile to be used by the secondary station at step S207. The operating profile can be indicated by a flag of only a few bits, which is much more efficient that signaling a new profile in full. This can be done with a quite similar signaling message as the request for change signaled by the secondary station as represented in FIG. 3. If the preferred profile signaled by the secondary station at step S205 is agreed to by the primary station, an Acknowledgement may be transmitted by the primary station at step S208.

In principle, this mechanism provides a finer degree of control that allows the secondary station to take into account operational requirements. A profile can include indications of:

- Mains/battery power source;
- Available battery power level;
- Preferred DRx (Discontinuous Reception) cycle length;
- Data rate supported (in UL (uplink) and DL (downlink));
- Number of Tx/Rx (Transmitter/Receiver) antennas;
- Operating bands supported;
- Support for FDD (Frequency Division Duplexing)/TDD (Time Division Duplex)/Half duplex;
- Number of aggregated carriers supported (e.g. in different bands);
- Modulation modes supported;
- MIMO modes supported;
- MBMS data rate supported;
- Handover capability;
- Support for closed user group;
- Interference environment (influencing processing required for interference suppression);
- Operation within femto-cell or relay coverage area.

Some operational requirements might not be well-expressed by the current UE capabilities IE (Information Element), even if extended in UMTS LTE-A (LTE-Advanced) release 10 and beyond. Accordingly, the capability sets are extended to define the preferred operation of features like, for example: the maximum number of carriers used in CA (Channel Assignment), the number of antennas used in MIMO operation, and others that will be apparent to those skilled in the art.

Further, the uploaded capability sets may be defined independently of the format of UE capabilities IE.

The invention may be applied to Radio Technology selection based on available battery power. For example switch between UMTS LTE (Universal Mobile Telecommunication System—Long Term Evolution) and GSM (Global System for Mobile Communications) to maintain a low power voice call.

The User may be allowed to select priorities (e.g. override power saving to continue with a power consuming application).

Another embodiment comprises a system such as LTE-A in which one or more of the following steps are executed:

- On registration (or at other times), the UE signals a category which indicates basic capabilities;
- On request from the network, the UE signals a plurality of capability profiles, and an indication of a preferred profile;
- The network may accept or reject each profile;
- The network may signal modified or alternative profiles;
- The network confirms which profile will be used for further operation;
- When a trigger condition is reached the UE signals an indication of a preferred profile to the network;
- The indication may be carried efficiently by physical layer signaling;

The indication may be carried reliably by L2 or L3 signaling; and

The network confirms which profile will be used.

Note that not all of the above steps may be essential for the technical effect of invention to be achieved.

As a variation, the capability profiles are derived by default from the secondary station category.

As a further variation, the UE may request upload of new or replacement profiles.

As a further variation, the network does not confirm the profile selection, but:

The network may nevertheless activate the requested profile or an alternative; or The network may thus ignore the UE request.

As a further variation, when a trigger condition is reached, the network may signal an indication of a new profile to the UE.

In order, for example, to enable traffic or power management or for other service requirements, the network may reduce unnecessary signaling by restricting the available UE functionality.

As a further variation, the profile returns to a default value after a time-out period.

As a further variation, the profile cannot be selected if the current UE configuration exceeds the capabilities permitted by the profile in which case:

The network may ignore or reject the profile; or

The network may store the profile pending UE reconfiguration.

As a further variation, the new profile is not implemented immediately but at a well-defined moment:

At a frame or sub-frame boundary; or

At a break in U-plane traffic transfer (when the connection can be reconfigured).

In a further embodiment, the details of one or more profiles may be determined implicitly (i.e. without explicit signaling). In an example related to downlink transmission, in the case of the LTE-A (Long Term Evolution—Advanced) a secondary station may signal to the network that it can support a given total bit rate, and that it can also operate simultaneously with more than one LTE carrier (i.e. carrier aggregation, with an indicated number of carriers) and that it can also operate simultaneously with LTE and one or more additional radio technologies (e.g. CDMA2000). In this example, one profile could correspond to the total bit rate and number of carriers that can be supported using LTE carrier aggregation (without simultaneous use of any other radio technology) being those signaled. Another profile could correspond to the total bit rate (less a pre-determined amount for another radio technology) and a number of carriers for LTE carrier aggregation (less the number of carriers required for another communication standard). The secondary station may signal to the network which profile is currently applicable.

In a variation of this embodiment, the secondary station indicates (e.g. when attaching to the network) that it may later switch between the profiles. By observing the secondary station behavior (e.g. whether granted transmission resources are actually used), the network may be able to determine which profile the secondary station is currently using. This approach could be used whether the details of profiles are explicitly or implicitly signaled. Thus, no resource is used for signaling the currently used profile since it is deduced by the primary station.

In a further variation, there is no explicit indication to the network of the current profile, or that the UE may change profiles, but the system design is such that the network is aware that at least a subset of UEs with certain capabilities may switch profiles. The network may be able to identify which profile a UE is following and react accordingly (e.g. with appropriate resource allocations).

The invention may be applicable to mobile telecommunication systems that operate according to well-known wireless communication standards including, GSM (Global System for Mobile Communications), UMTS (Universal Mobile Telecommunication System), UMTS LTE (Universal Mobile Telecommunication System—Long Term Evolution) and UMTS LTE-A (Universal Mobile Telecommunication System—Long Term Evolution—Advanced), but also in some variants to any communication system having radio stations with limited capabilities.

In the present specification and claims the word "a" or "an" preceding an element does not exclude the presence of a plurality of such elements. Further, the word "comprising" does not exclude the presence of other elements or steps than those listed.

A non-transitory computer-readable media comprise all computer-readable media except for a transitory, propagating signal.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a secondary station, the method comprising:

in the secondary station:

a processor adapted to select a first subset of operating profiles of a plurality of available operating profiles when the operating requirements of the secondary station change, the first subset of operating profiles being different than a current subset of operating profiles;

in response to the processor selecting the first subset of operating profiles, a transmitter controlled by the processor transmitting to a primary station an indication of the selected first subset of operating profiles, as a request for the selected first subset of operating profiles to be used as the current subset of operating profiles;

the processor switching from use of the current subset of operating profiles to use of the selected first subset of operating profiles as the current subset of operating profiles;

the processor selecting at least one first operating profile of the current subset of operating profiles depending on a specified event, the at least one first operating profile being different than the at least one current operating profile; and in response to the processor selecting the at least one first operating profile, the transmitter transmitting to the primary station, an indication of the at least one selected first operating profile, as a request for the at least one selected first operating profile to be used as the at least one current operating profile;

the processor switching from use of the at least one current operating profile to use of the selected at least one first operating profile as the at least one current operating profile;

wherein the secondary station is configured to respond to at least one of the following group as the specified event:

the energy remaining in a battery of the secondary station decreases to or below a predetermined level;

the secondary station becomes connected to a permanent source of power;
the secondary station has entered a particular location;
a handover from communication with a previous primary station to communication with a first primary station;
the activation of a particular service;
the deactivation of a particular service;
a user of the secondary station requests a preferred operating mode; and
a change of hardware resources available to the secondary station.

2. The method of claim 1, wherein the secondary station is configured to respond to the following as the specified event:
the secondary station receives a request from the primary station for changing a first operating profile out of the first subset of operating profiles.

3. The method of claim 1, wherein the secondary station transmitter is configured to transmit the indication of the at least one first operating profile to the primary station that is a relay or a femto-cell primary station.

4. The method of claim 1, wherein the indication of the first subset of operating profiles comprises one of the group of:
the first subset of operating profiles; and
a set of indexes representing the first subset of operating profiles.

5. The method of claim 1, wherein the indication of the at least one first operating profile comprises one of:
the at least one first operating profile;
the at least one first operating profile and at least one preferred parameter value to be used with the at least one first operating profile;
at least one index representative of the at least one first operating profile, and
the index representative of the at least one first operating profile and at least one preferred parameter value to be used with the at least one first operating profile.

6. The method of claim 1, wherein the indication of the at least one first operating profile comprises at least one preferred parameter value to be used with the at least one first operating profile, the preferred parameter value being at least any one of:
a number of antennas to be used in multiple-input and multiple output (MIMO);
a preferred data rate;
a maximum number of carriers; and
one or more preferred operating bands.

7. The method of claim 1, wherein prior to transmitting the indication of the first subset of operating profiles, the secondary station transmits to the primary station an indication of the plurality of available operating profiles that the secondary station is capable of following.

8. The method of claim 1, wherein at least one of the operating profiles of the subset of first operating profiles, operate according to any one of the following group:
the global system for mobile communication (GSM) standard;
the universal mobile telecommunication system (UMTS) standard;
the universal mobile telecommunication system (UMTS) long term evolution (UMTS LTE) standard; and
the universal mobile telecommunication system (UMTS) long term evolution advanced (UMTS LTE-A) standard.

9. The method of claim 1, wherein switching from use of the current subset of operating profiles to use of the first subset of operating profiles depends on receiving or determining at least one of:

an indication of allowance from the primary station to use the first subset of operating profiles;
an indication of an instruction from the primary station to use the first subset of operating profiles;
an indication of rejection from the primary station not to use the first subset of operating profiles;
an expiration of a timeout for receiving an indication from the primary station, the timeout starting upon the first transmitting of the indication of the first subset of operating profiles to the primary station; and
an expiration of a timeout for receiving an acknowledgment ACK or negative acknowledgment NACK from the primary station, the timeout starting upon the first transmitting of the indication of the first subset of operating profiles to the primary station.

10. The method of claim 1, wherein switching from use of the at least one current operating profile to use of the selected at least one first operating profile depends on one of receiving or determining at least one of:
an indication of allowance from the primary station to use the at least one first operating profile;
an indication of an instruction from the primary station to use the at least one first operating profile;
an indication of rejection from the primary station not to use the at least one first operating profile;
an expiration of a timeout for receiving an indication from the primary station, the timeout starting upon the second transmitting of the indication of the at least one first operating profile to the primary station; and
an expiration of a timeout for receiving an acknowledgment ACK or negative acknowledgment NACK from the primary station, the timeout starting upon the second transmitting of the indication of the at least one first operating profile to the primary station.

11. The method of claim 1, wherein switching from use of the at least one current operating profile to use of the selected at least one first operating profile depends on receiving an allowance from the primary station; and wherein the secondary station is configured to deduce the allowance received from the primary station from at least one of:
an expiration of a timeout initiated by transmitting to the primary station the at least one first operating profile, or an indication of the at least one first operating profile;
the transmitter receiving an acknowledgement message from the primary station indicating allowance of the at least one first operating profile, or an indication of the at least one first operating profile;
the transmitter receiving a parameter value for the at least one first operating profile; and
the transmitter receiving an index representative of the at least one first operating profile.

12. The method of claim 1, wherein the secondary station is configured to receive from the primary station a response signal indicating any one of the group of:
a confirmation or rejection of the at least one first operating profile;
an echo of the indication of the at least one first operating profile transmitted by the secondary station to the primary station; and
a further operating profile as an alternative to the at least one first operating profile transmitted by the secondary station to the primary station.

13. The method of claim 1, wherein transmitting an indication of the first subset of operating profiles to the primary station comprises transmitting a set of numeric indices representative of the first subset of operating profiles.

14. The method of claim 1, wherein the secondary station is configured for simultaneous communications using at least two carriers, and wherein each of the at least two carriers use the same standard or wherein different carriers of the at least two carriers use different respective standards.

15. The method of claim 13, wherein at least one operating profile from among the first subset of operating profiles has a total supported bit rate corresponding to two carriers using the same standard, and another operating profile from among the first subset of operating profiles uses one carrier and has the same total supported bit rate less an amount corresponding to the total supported bit rate on another carrier using a different standard.

16. The method of claim 1, wherein the secondary station is a handheld device.

17. A secondary station comprising:
a processor adapted to select a first subset of operating profiles of a plurality of available operating profiles dependent upon a change in the operating requirements of the secondary station, the first subset of operating profiles being different than a current subset of operating profiles;
a transmitter controlled by the processor adapted to communicate with a primary station; the transmitter being configured to transmit to the primary station an indication of the first subset of operating profiles, in response to the selection of the first subset of operating profiles by the processor;
the processor configured to switch the secondary station from use of the current subset of operating profiles to use of the selected first subset of operating profiles as the current set of operating profiles;
the processor configured to select at least one first operating profile of the first subset of operating profiles depending on a specified event, the at least one first operating profile being different than the at least one current operating profile;
the processor configured to transmit to the primary station, an indication of the at least one first operating profile, in response to the selection of the first subset of operating profiles, whereby the transmission of the indication is intended as a request to the primary station to use the at least one first operating profile as the at least one current operating profile;
the processor configured to switch the operation of the secondary station from use of the current subset of operating profiles to use of the first subset of operating profiles;
wherein the secondary station is configured to respond to any one of the following group as the specified event:
the energy remaining in a battery of the secondary station decreases to or below a predetermined level;
the secondary station becomes connected to a permanent source of power;
the secondary station enters a particular location;
a handover from communication with a current primary station to communication with a subsequent primary station;
the activation of a particular service;
the deactivation of a particular service;
a user of the secondary station requesting a preferred operating mode; and
a change of hardware resources available to the secondary station.

18. A primary station comprising:
a processor configured to control the operation of the primary station;
a receiver controlled by the processor configured to communicate with a secondary station for receiving an indication of a first subset of operating profiles from among a plurality of available operating profiles;
the processor configured to determine whether to accept or reject the received indication of the first subset of operating profiles in response to receiving the indication of the first subset of operating profiles;
the processor configured to switch the operation of the primary station from use of a current subset of operating profiles to use of the first subset of operating profiles as the current subset of operating profiles on the condition that the primary station accepts the received indication of the first subset of operating profiles;
a receiver of the primary station configured to receive an indication of at least one first operating profile from among the current subset of operating profiles;
the processor configured to determine whether to accept or reject the received at least one first operating profile in response to the receiver receiving the indication of the at least one first operating profile; and
the processor configured to switch the operation of the primary station from use of the current operating profile to use of the first operating profile as the current operating profile, on the condition that the at least one first operating profile is accepted.

19. The primary station of claim 18, wherein the primary station is a radio base station installed at a fixed position.

20. The primary station of claim 18, wherein the processor is configured to control a transmitter to transmit to the secondary station an indication of whether the primary station approves of the indication of the first subset of operating profiles received from the secondary station.

21. The primary station of claim 18, wherein the processor is configured to control a transmitter to transmit to the secondary station an indication of whether the primary station approves of the indication of the first operating profile received from the secondary station.

22. A method of operating a primary station, the method comprising:
a receiver controlled by a processor, the receiver receiving from a secondary station an indication of a first subset of operating profiles of a plurality of available operating profiles;
in response to receiving the indication of the first subset of operating profiles, the processor determining whether to accept or reject the received indication of the first subset of operating profiles;
the processor switching the operation of the primary station from using a current subset of operating profiles to using the first subset of operating profiles as the current subset of operating profiles when the first subset of operating profiles is determined to be accepted by the processor;
the receiver further receiving an indication of the at least one first operating profile, the at least one first operating profile being a member of the current subset of operating profiles;
in response to the receiver receiving the indication of the at least one first operating profile, the processor determining whether to accept or reject the received indication of the at least one first operating profile; and
the processor switching the operation of the primary station from use of a current operating profile to use of the first operating profile as the current operating profile, when the at least one first operating profile is accepted; and wherein the primary station is a radio base station that is installed at a fixed position.

23. A non-transitory computer-readable storage medium having stored thereon instructions that when executed cause processing circuitry of a secondary station to
select a first subset of operating profiles of a plurality of available operating profiles when the operating requirements of the secondary station change, the first subset of operating profiles being different than a current subset of operating profiles;
in response to the selection of the first subset of operating profiles, transmit to a primary station, an indication of the first subset of operating profiles;
switch from use of the current subset of operating profiles to use of the selected first subset of operating profiles as the current subset of operating profiles; and
select at least one first operating profile of a current subset of operating profiles depending on a specified event, the at least one first operating profile being different than the at least one current operating profile; and
in response to the selection of the at least one first operating profile, transmit to the primary station, an indication of at least one first operating profile, to request to use the at least one first operating profile as the at least one current operating profile;
switch from use of the at least one current operating profile to use of the second selected at least one first operating profile as the at least one current operating profiles;
wherein the secondary station is configured to respond to any one of the following group as the specified event:
the energy remaining in a battery of the secondary station decreases to or below a predetermined level;
the secondary station becomes connected to a permanent source of power;
the secondary station has entered a particular location;
a handover from communication with a previous primary station to communication with a first primary station;
the activation of a particular service;
the deactivation of a particular service;
a user of the secondary station requests a preferred operating mode; and
a change of hardware resources available to the secondary station.

24. A non-transitory computer-readable storage medium having stored thereon instructions that when executed cause processing circuitry of a primary station to:
receive from a secondary station an indication of a first subset of operating profiles of a plurality of available operating profiles;
in response to receiving the first subset of operating profiles, determine whether to accept or reject the received indication of the first subset of operating profiles;
switch the operation of the primary station from use of a current subset of operating profiles to use of the first subset of operating profiles as the current subset of operating profiles when the first subset of operating profiles is accepted;
receive an indication of the at least one first operating profile, the at least one first operating profile being a member of the current subset of operating profiles;
in response to receiving the indication of the at least one first operating profile, determine whether to accept or reject the received first operating profile; and
switch the operation of the primary station from using a current operating profile to using the first operating profile as the current operating profile, when the at least one first operating profile is accepted; and
wherein the primary station is a radio station with a fixed location.

25. A method for operating a secondary station in a mobile communication network, the method comprising:
a transmitter controlled by a processor, transmitting to a primary station an indication of a first subset of operating profiles of a plurality of available operating profiles, the first subset of operating profiles being different than a current subset of operating profiles;
the processor determining that the first subset of operating profiles is not rejected by the primary station;
in response to the determination that the first subset of operating profiles is not rejected by the primary station, the processor switching from use of the current subset of operating profiles to use of the first subset of operating profiles as the current subset of operating profiles;
the processor selecting a first operating profile from the current subset of operating profiles depending on the occurrence of a specified event that is detectable by the secondary station,
the transmitter transmitting an indication of the first operating profile to the primary station;
the processor determining that the primary station did not reject the first operating profile;
the processor switching from use of the current operating profile to use of the first operating profile as a current operating profile;
wherein the specified event comprises at least one of:
the energy remaining in a battery of the secondary station is below a predetermined level,
the secondary station is connected to a permanent source of power, the secondary station has entered a particular location,
a handover from communication with a previous primary station to communication with a current primary station,
the activation of a particular service,
the deactivation of a particular service,
a user of the secondary station has requested a preferred operating mode,
a change of hardware resources available to the secondary station.

26. The method of claim 25, wherein the secondary station is a radio station which is either: a mobile device; or a wireless sensor node.

27. The method of claim 25, wherein the specified event comprises the secondary station receiving a request from the primary station for changing a current operating profile.

28. The method according to claim 25, wherein the specific event is a handover from communication with a previous primary station to communication with a current primary station, and at least one of the current primary station or the previous primary station is a relay or a femto cell primary station.

29. The method according to claim 25, wherein the indication of the first subset of operating profiles comprises one of the following:
the operating profiles in the first subset of operating profiles;
a set of numerical indices indicating the operating profiles in the first subset of operating profiles in a list of available operating profiles.

30. The method according to claim 25, wherein the indication of the first subset of operating profiles comprises one of the following:

the operating profiles in the first subset of operating profiles;

a set of numerical indices indicating the operating profiles in the first subset of operating profiles in a list of available operating profiles.

31. The method of claim 25, wherein the determination that the primary station has not rejected the first subset of operating profiles depends on one of receiving or determining by the processor at least one of:

an indication of allowance from the primary station to use the first subset of operating profile;

an indication of an instruction from the primary station to use the first subset of operating profiles;

an indication of rejection from the primary station not to use the first subset of operating profiles;

an expiration of a timeout for receiving an indication from the primary station, the timeout starting upon the first transmitting of the indication of the first subset of operating profiles to the primary station; and an expiration of a timeout for receiving an acknowledgment (ACK) or negative acknowledgment (NACK) from the primary station, the timeout starting upon the first transmitting of the indication of the first subset of operating profiles to the primary station.

32. The method of claim 25, wherein the determination that the primary station has not rejected the first operating profile depends on receiving or determining by the processor at least one of:

an indication of allowance from the primary station to use the first operating profile;

an indication of an instruction from the primary station to use the first operating profile;

an indication of rejection from the primary station not to use the first operating profile;

an expiration of a timeout for receiving an indication from the primary station, the timeout starting upon the transmission of the indication of the first operating profile to the primary station; and an expiration of a timeout for receiving an acknowledgment ACK or negative acknowledgment NACK from the primary station, the timeout starting upon the transmission of the indication of the first operating profile to the primary station.

\* \* \* \* \*